(12) United States Patent
Hercock

(10) Patent No.: US 12,719,163 B2
(45) Date of Patent: Aug. 25, 2026

(54) PRINTED ANTENNA DEVICE

(71) Applicant: BRITISH TELECOMMUNICATIONS PUBLIC LIMITED COMPANY, London (GB)

(72) Inventor: Robert Hercock, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 85 days.

(21) Appl. No.: 18/832,736

(22) PCT Filed: Dec. 13, 2022

(86) PCT No.: PCT/EP2022/085598
§ 371 (c)(1),
(2) Date: Jul. 24, 2024

(87) PCT Pub. No.: WO2023/143801
PCT Pub. Date: Aug. 3, 2023

(65) Prior Publication Data

US 2025/0149784 A1 May 8, 2025

(30) Foreign Application Priority Data

Jan. 25, 2022 (GB) ..................................... 2200905

(51) Int. Cl.
*H01Q 21/00* (2006.01)
*B33Y 80/00* (2015.01)
(Continued)

(52) U.S. Cl.
CPC ................ *H01Q 3/34* (2013.01); *B33Y 80/00* (2014.12); *H01Q 1/36* (2013.01); *H01Q 21/0087* (2013.01); *H01Q 21/06* (2013.01)

(58) Field of Classification Search
CPC ........ H01Q 3/34; H01Q 1/36; H01Q 21/0087; H01Q 21/06; H01Q 9/0407; H01Q 21/065;
(Continued)

(56) References Cited

U.S. PATENT DOCUMENTS 3,308,390 A * 3/1967 Crapuchettes ....... H05B 6/6402
315/39
4,060,750 A * 11/1977 Tashiro .................. H01J 23/36
315/39.75
(Continued)

FOREIGN PATENT DOCUMENTS

EP 1588453 A1 10/2005
EP 2921285 A1 9/2015
(Continued)

OTHER PUBLICATIONS

Jon Cartwright, "Return of the Vacuum Tube", May 23, 2012, retrieved from the internet on Sep. 11, 2014 (6 pages).
(Continued)

*Primary Examiner* — Dameon E Levi
*Assistant Examiner* — Jordan E. DeWitt
(74) *Attorney, Agent, or Firm* — Nixon & Vanderhye P.C.

(57) ABSTRACT

A 3D printed antenna device comprising a cavity connected between an anode and a cathode and configured to resonate at a predetermined frequency and power to generate an output feed; and an antenna element configured to receive the output feed from the cavity.

11 Claims, 5 Drawing Sheets

(51) Int. Cl.
*H01Q 1/36* (2006.01)
*H01Q 3/34* (2006.01)
*H01Q 21/06* (2006.01)

(58) Field of Classification Search
CPC ........ H01Q 1/38; H01Q 21/061; B33Y 80/00; B33Y 10/00
See application file for complete search history.

(56) References Cited

U.S. PATENT DOCUMENTS

| | | | | |
|---|---|---|---|---|
| 4,075,534 | A | 2/1978 | Saito et al. | |
| 4,247,508 | A | 1/1981 | Housholder | |
| 4,575,330 | A | 3/1986 | Hull | |
| 4,863,538 | A | 9/1989 | Deckard | |
| 2004/0036132 | A1 | 2/2004 | de los Santos | |
| 2005/0104506 | A1 | 5/2005 | Youh et al. | |
| 2006/0006787 | A1 | 1/2006 | Champion et al. | |
| 2009/0153426 | A1 | 6/2009 | Worl et al. | |
| 2010/0321132 | A1 | 12/2010 | Park | |
| 2014/0002948 | A1 | 1/2014 | Yoon et al. | |
| 2014/0307361 | A1 | 10/2014 | Kahmen | |
| 2015/0270089 | A1* | 9/2015 | Ghanea-Hercock | B05D 1/36 313/308 |
| 2016/0380634 | A1* | 12/2016 | Ghanea-Hercock | H03K 19/20 326/111 |
| 2017/0009090 | A1 | 1/2017 | Haghzadeh et al. | |
| 2019/0017185 | A1* | 1/2019 | Takshi | C25D 17/12 |
| 2020/0021342 | A1* | 1/2020 | Ge | H01Q 3/46 |
| 2020/0278316 | A1* | 9/2020 | Lanning | H01M 4/62 |
| 2021/0102293 | A1* | 4/2021 | Braghiroli | H05H 1/46 |
| 2024/0044031 | A1* | 2/2024 | Tang | B33Y 10/00 |
| 2025/0149784 | A1* | 5/2025 | Hercock | B33Y 80/00 |

FOREIGN PATENT DOCUMENTS

| | | | |
|---|---|---|---|
| EP | 3109034 | A1 | 12/2016 |
| GB | 2328791 | A | 3/1999 |
| JP | H935670 | A | 2/1997 |
| JP | H11306997 | A | 11/1999 |
| JP | 2006049305 | A | 2/2006 |
| JP | 2008311083 | A | 12/2008 |
| KR | 20010068429 | A | 7/2001 |
| KR | 20130051767 | A | 5/2003 |
| WO | 2004055935 | A1 | 7/2004 |
| WO | 2007072404 | A2 | 6/2007 |
| WO | 2013108705 | A1 | 7/2013 |

OTHER PUBLICATIONS

Peter “Sci” Turpin: An old-school solution to printing reprap electronics?, Feb. 2, 2010, retrieved from the internet on Sep. 11, 2014 (3 pages).
Extended European Search Report dated Sep. 24, 2014, issued for European Application No. 14250050.3-1703 (4 pages).
“3D Printing”, Wikipedia, Jan. 27, 2024, 23 pages.
Ali Araghi, et al., “Reconfigurable Intelligent Surface (RIS) in the Sub-6 GHz Band: Design, Implementation, and Real-World Demonstration”, IEEE Access, vol. 10, dated Jan. 7, 2022, pp. 2646-2655 (10 pages).
Jacob Bayless, et al., “Wire Embedding 3D Printer”, Engineering Physics, University of British Columbia, Apr. 12, 2010, 45 pages.
Charles Q. Choi, et al., “Loudspeaker Is First Complete 3D-Printed Consumer Electronic”, Dec. 19, 2013, 6 pages.
Aline Eid, et al., “Inkjet-/3D-Printed Perpetual Electronics and Modules; RF and mm-Wave Devices for 5G+, IoT, Smart Agriculture, and Smart Cities Applications”, IEEE Microwave Magazine, Ieeeservice Centre, vol. 21, No. 12, Nov. 6, 2020, 17 pages.
Nick Flaherty, “Flexible antenna captures 5G power of IoT”, Mar. 30, 2021, 2 pages.
Chang-Hoon Han, et al., “Parallel-Plate MEMS Variable Capacitor With Superior Linearity and Large Tuning Ratio Using a Levering Structure”, Journal of Microelectromechanical Systems, IEEE Service Center, US, vol. 20, No. 6, Dec. 1, 2011, pp. 1345-1354 (10 pages).
Jin-Woo Han, et al., “Vacuum nanoelectronics: Back to the future?—Gate insulated nanoscale vacuum channel transistor”, Applied Physics Letters, vol. 100, No. 213505, published online May 23, 2012, 5 pages.
S. Jiguet, et al., “Conductive SU8-Silver Composite Photopolymer”, Swiss Federal Institute of Technology, IEEE, 2004, pp. 125-128 (4 pages).
Collin Ladd, et al., “3D Printing of Free Standing Liquid Metal Microstructures”, Advanced Materials, 2013, 5 pages.
Kamal Prakash Pandey, et al., “Design and Analysis of MEMS Varactor”, Recent Advances on Engineering, Technology and Computational Sciences (RAETCS), IEEE, 2018, 6 pages.
Goran Stojanovic, et al., “Combining rapid prototyping techniques in mechanical engineering and electronics for realization of a variable capacitor”, Rapid Prototyping Journal, vol. 20, No. 2, Mar. 2014, pp. 115-120 (7 pages).
Ruitao SU, et al., “3D-printed flexible organic light-emitting diode displays”, Science Advances, Research Article, vol. 8, No. 1, Jan. 7, 2022, 11 pages.
“Vaccum Tube”, Wikipedia, Jan. 27, 2024, 30 pages.
Combined Search and Examination Report for GB Application No. 2200905.4 dated Jun. 17, 2022, 8 pages.
Combined Search and Examination Report for GB Application No. 2300954.1 dated Jul. 14, 2023, 7 pages.
Combined Search and Examination Report for GB Application No. 2400804.7 dated Mar. 20, 2024, 5 pages.
Extended European Search Report for EP Application No. 23152897.7 dated Jun. 27, 2023, 11 pages.
International Search Report and Written Opinion of the ISA for PCT/EP2023/084256 dated Mar. 18, 2024, 16 pages.
International Search Report and Written Opinion of the ISA for PCT/EP2022/085598 dated Apr. 5, 2023, 17 pages.
Jon Cartwright, “Return of the Vacuum Tube”, May 23, 2012, 6 pages.
Peter “Sci” TURPIN, “An old-school solution to printing reprap electronics?”, Wiki, IRC, Magazine, Feb. 2, 2010, 3 pages.
Extended European Search Report for EP Application No. 14250050.3 dated Sep. 24, 2014, 4 pages.
International Preliminary Report on Patentability dated Aug. 7, 2025, issued for International Application No. PCT/EP2023/084526 (9 pages).
International Preliminary Report on Patentability and Written Opinion of the International Searching Authority dated Aug. 8, 2024, issued for International Application No. PCT/EP2022/085598 (10 pages).
Patents Act 1977: Intention to Grant under Section 18(4) dated Aug. 2, 2024, issued for GB Application No. GB2400804.7 (2 pages).
RepRap 3D Printer with Wire Embedding Capability, retrieved from http://youtu.be/iclmH6-ba5Y; Apr. 14, 2010 (2 pages).

* cited by examiner

PRINTED ANTENNA DEVICE

CROSS-REFERENCE TO RELATED APPLICATIONS

This application is the U.S. national phase of International Application No. PCT/EP2022/085598 filed Dec. 13, 2022 which designated the U.S. and claims priority to GB Patent Application No. 2200905.4 filed Jan. 25, 2022, the entire contents of each of which are hereby incorporated by reference.

FIELD

The present invention relates to the design and manufacture of a printed antenna device. In particular it relates to the design manufacture of a 3D printed antenna array including an arrangement of vacuum cavities forming the antennae.

BACKGROUND

Additive manufacturing, also known as three dimensional (3D) printing, is a process of manufacturing a three dimensional solid object from a model such as a digital model by an additive process in which material is layered, adhered, bonded or otherwise deposited successively until the solid object is formed. Such an approach is in contrast to traditional manufacturing techniques where articles are formed from the assembly of parts which themselves may be machined, cast or moulded.

There are many benefits to additive manufacturing over traditional manufacturing techniques, including technical benefits and commercial benefits. Technically, additive manufacturing allows many arrangement of a three dimensional object to be created from a growing number of materials, including plastics, metals and ceramics. The arrangement can include complex features, even internally since the additive approach to manufacturing is capable of generating complex structure. Additive approaches generate less waste compared to traditional approaches, provide increased consistency between articles of manufacture, improved speed of manufacture from initial design with minimal setup required, the advantages of novel structures and shapes and new combinations of materials.

Commercially, additive manufacturing provides considerable cost-savings over traditional manufacturing techniques, especially where a number of articles for manufacture is relatively small. For example, prototypes, proof-of-concepts, spare-parts and articles manufactured in isolated or remote locations, such as in orbit or space, are readily produced at low cost using additive manufacturing. The speed of manufacturing is also a benefit since a three dimensional article can be produced from a three dimensional design relatively rapidly.

Additive manufacturing covers a number of approaches. Extrusion deposition is an approach to additive manufacturing in which beads of material are extruded in a controlled manner either by way of a moveable extruder ("print-head"); a moveable table or support; or both. The extruded beads harden rapidly to form a layer or part of an article onto which further extrusion can take place. In this way the article is built-up additively.

An alternative approach is the selective fusing of granular materials such as a selective sintering or melting of metals or polymers. Using such an approach granular material is deposited in layers and selectively sintered, melted or bonded using, for example, convection heat, laser or electron beam. The selection is made based on a three dimensional model of the article in a layered manner. In this way the article is built-up additively.

FIG. 1 depicts a known three dimensional article 100 with integral active electronic components and having a channel 102 to an evacuation port 104 of the article in accordance with embodiments of the present invention. The article 100 is manufactured by an additive manufacturing process. FIG. 1 is from European patent publication number EP2921285.

The embodiments described below seek to advance the use of 3D printing techniques in forming various active devices.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

According to one aspect of the present invention there is provided a 3D printed antenna device comprising a cavity connected between an anode and a cathode and configured to resonate at a predetermined frequency and power to generate an output feed; and an antenna element configured to receive the output feed from the cavity.

In an aspect the cavity is a microwave cavity.

In an aspect the cavity has a predetermined topography.

In an aspect the cavity has a predetermined size.

In an aspect the cathode is located at one end of the cavity and extends from an input feed through the cavity towards the output feed.

In an aspect the anode substantially surrounds the cavity.

In an aspect the device further comprising a conduit from the cavity to an exterior surface which is connectable to a vacuum pump to create a vacuum in the cavity.

In an aspect the cavity includes a sub-cavity within the cavity.

According to a second aspect of the present invention there is provided a 3D printed antenna array comprising a plurality of 3D printed antenna devices of another aspect of the invention.

In an aspect the plurality of 3D printed antenna devices are arranged in rows and columns and each is separated from the others by dividers.

In an aspect the plurality of 3D printed antenna devices form a phase array antenna, PAA, or a multiple in multiple out, MIMO, antenna.

In an aspect the plurality of 3D printed antenna devices resonate at two or more resonant frequencies.

In an aspect the two or more resonant frequencies are based on the at least one of frequency, power, shape and size.

In an aspect the 3D printed antenna array is made from at least one conductive material and at least one non-conductive material.

According to a third aspect of the present invention there is provided a method of manufacturing an 3D printed antenna device comprising using an additive manufacturing process to: form a non-electrically conductive substrate; form a non-electrically conductive perforated layer having a cavity; form electrically conductive anode and cathode elements relative to the cavity; deposit a conductive electrical connection to each of the elements suitable for imparting an electrical potential difference between the elements;

form an antenna element connected to the cavity; and form a non-electrically conductive sealing layer atop the perforated layer so as to retain and seal the cavity in the perforated layer and support the antenna element.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples The creation of high-power microwave emitters was a technical challenge in the early period of wireless communications. The first solutions used Magnetron or Klystron tubes to generate or amplify radio frequency (RF) signals in this band. Later Travelling Wave tubes were developed with improved frequency and noise characteristics.

The present invention relates to the creation of a phase array antenna (PAA), or multiple in multiple out (MIMO) antenna, using a novel 3D printing technique. The invention allows the fabrication of both the antenna array and drive electronics in a single process. In the present invention, the use of resonant cavities with a thermionic vacuum technology enables a high microwave output.

The present invention uses a 3D printed cathode and anode device and further includes a complex multi-cavity structure. This structure produces a resonant amplification of the RF signal, similar to a Cavity Magnetron. Using advanced 3D printing techniques, a 2D multi-layer sheet as a set of antennae in a grid formation is produced and forms the PAA or MIMO.

The use of additive manufacturing techniques (also known as 3D printing) also enables new cavity designs to be produced that would not be possible, using traditional valve and magnetron methodologies. Software custom microwave and 5G phase-array antenna are created to suit any environment and in substantive volumes, with a very low cost of manufacture. This will be important as 5G develops.

Figure 1:
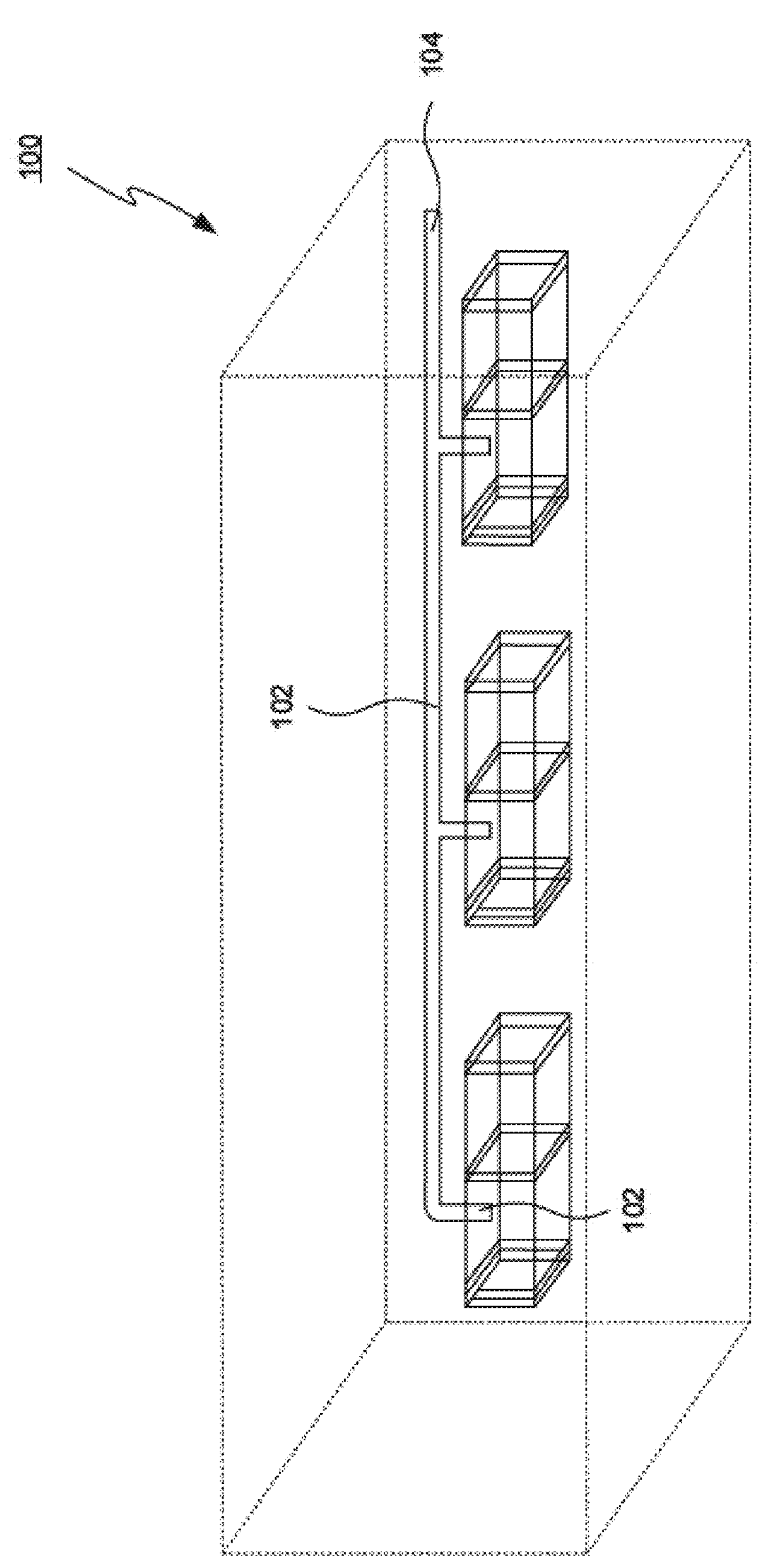
FIG. 1 is a known 3D printed electronic device.
Figure 2:
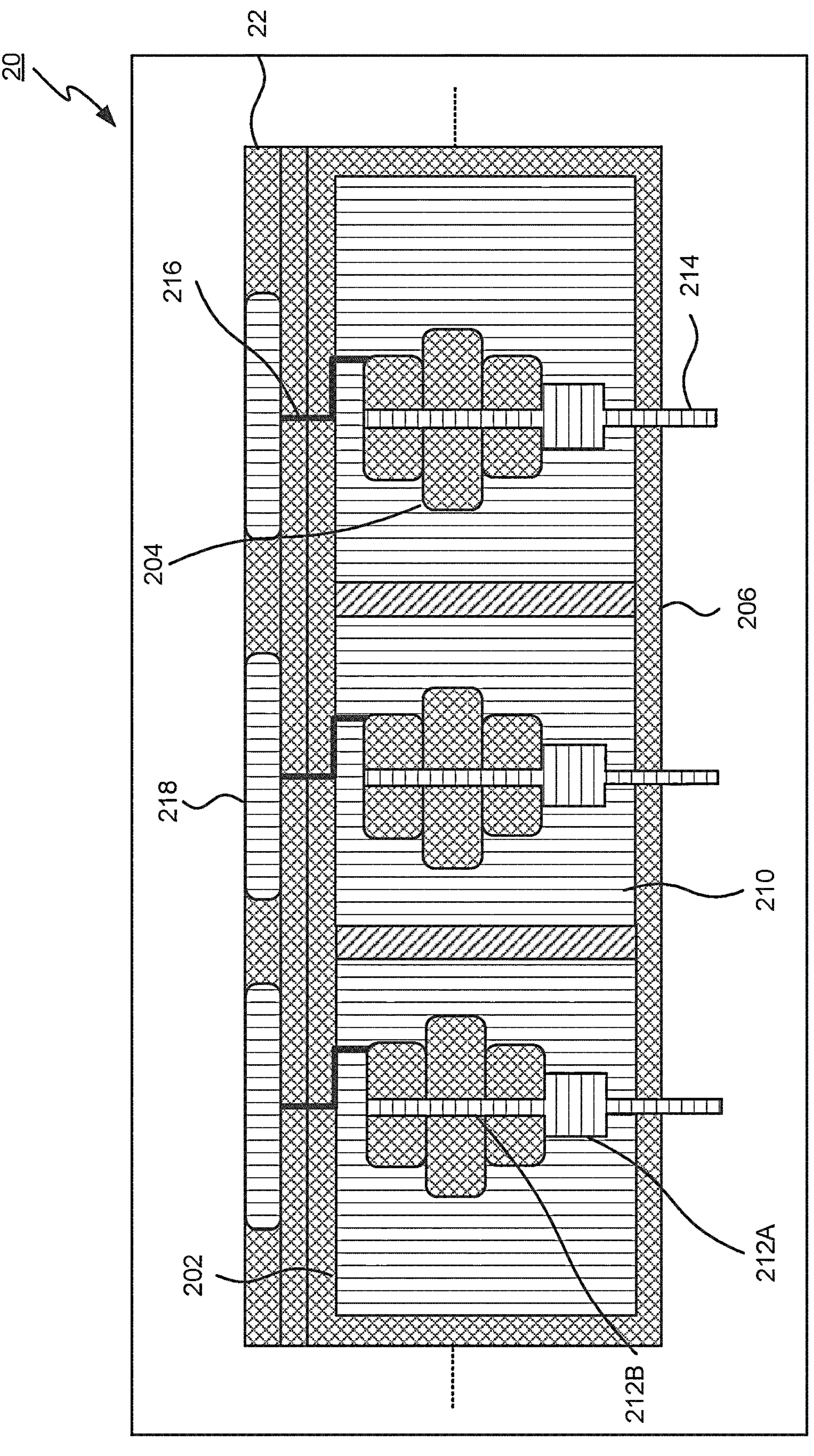
FIG. 2 is a cross-sectional view of an antenna array according to an aspect of the invention.

Referring to FIG. 2, an antenna array 200 is provided and includes a plurality of cells 202. Each cell includes a cavity 204, each of which acts as a cavity magnetron in use. The cavity is preferably a microwave (LC) cavity. The array includes an insulating shell 206 and a number of dividers 208 between cells 202. The cavities 204 are substantially surrounded by an anode 210. At the base of the cavity there is a cathode 212*a* which extends into the cavity 212*b* and which is connected to an input feed 214 for each cell 202. Each cell includes a respective output feed 216 which is connected to an antenna element 218. The antennae 218 are recessed into a deposited metal conductor material support layer 220 printed atop the cells.

The result is an arrangement of vacuum cavities 202 surrounding a central cathode element 212*b*. The outer structure of the support material forms the anode 210 in the circuit. Electron flow from the cathode enters the cavities to realize an RF resonance. The resulting RF signal is then extracted using the output feed and antenna on one of the cavities. FIG. 2 is an example design for a 3D printed magnetron with multiple resonant cavities.

Figure 3:
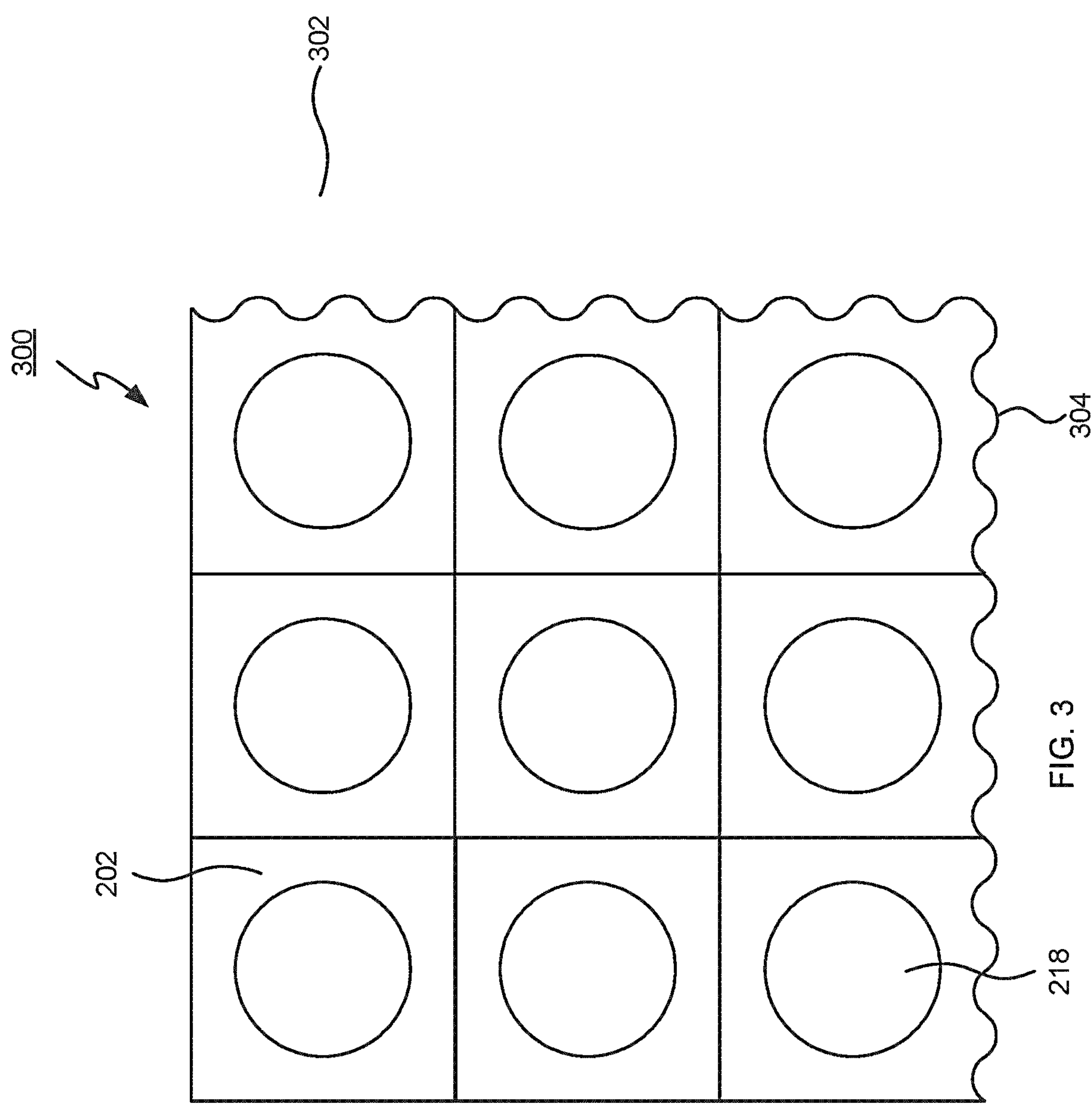
FIG. 3 is a view of the antenna array of FIG. 2 from above.

FIG. 3 is a view from above, showing an antenna array 300 of cells 202 showing the respective antenna 218 of each arranged in rows 302 and columns 304. It will be appreciated that the numbers of rows and columns can be bigger or smaller than shown and is ideally a large scale grid of antennae.

Each cavity is connected to a conduit (not shown) which is used after manufacture to generate a vacuum in the cavity. The conduit is configured to be connected to a vacuum pump at an external surface of the device, which causes a vacuum in each cavity. The conduit is then sealed to maintain the vacuum in the cavities. The conduit may connect all cavities or may just connect a set of cavities 204 in one of a row 302 or a column 304 in the array 300. Various alternative arrangements of conduits can be used to connect cavities for evacuation.

A full PAA will have a large number of cavities arranged across a 2D sheet area. Each cavity cell is isolated by the dividers 208 between each cell. If required further electronics can be integrated into the structure below the microwave cells, for example structures configured for signal amplification or processing. The antenna array may include additional elements not shown, which can similarly be formed in the 3D printing process. For example, the antenna may be connected to solid state receivers, or use embedded printed valve amplifier triodes. Also any other electronic devices required to operate with the antenna array for whatever purpose can also be produced in the process by designing the full specification of the device prior to the 3D printing process. This is described in greater detail below.

The design of the shape and configuration of the cavities can be modified to give rise to different frequency or power outputs. The likely build material would be a ceramic primary structure as an insulator and heat conductor, with metal deposition for the cathodes, anodes, and antenna components. Instead of ceramics plastics material could be used. Clearly the suggested material are by way of example only.

Selecting different cavity shapes and dimensions gives rise to frequency and power outputs that can be tuned to specific applications. This process takes advantage of the complex topologies 3D manufacturing can produce. This gives significant production flexibility over traditional microwave production techniques.

The cavities can have many different shapes and a single array can include all the same shape or different shapes. Typical topologies could include: Spiral shapes; rectilinear forms; elongated cavities; fractal structures, i.e. recursive sub-cavities; other sub-structures, i.e. cavities within outer cavities; combinations of the preceding, etc.

An advantage of the more complex topologies is that the antenna arrays gives rise to noise reduction as specific smaller cavities could be added within the primary structure, to absorb high frequency noise.

A further advantage is to improve phase control of the output signal. In traditional cavity magnetrons, there is very poor phase control which limits their utility. The present design uses multiple arrays of resonant cavities, with a set multiple of Pi radian offset, to create a phase control function.

A Fractal sub-structure could be used to suppress side-bands; by absorbing selected sub-harmonics. This can be configured in the design phase and then implemented in the 3D printing phase.

At design time the precise topology of each emitter across the surface of the PAA is determined and designed. In some cases the array may include variable topologies for one or more cavities or groups of cavities, such that specific frequencies are created at different parts of the array. The design process will thus include defining different areas of the array having different cavity topologies and where necessary adjustment to the other component elements of a specific cell 202. Any different combinations of cell could be formed on a single substrate. The result is a single PAA which is usable for multiple 5G frequencies in parallel.

The invention thus enables the construction of a phased array antenna with integrated microwave emitters. A single software driven process can then produce both the PAA and any other elements including passive and active electronics.

By varying the cavity design, radar frequency emission can be created that convert the PAA into a phased array radar emitter. Vector Embedding methods are used to create a high dimensional vector space, in which concepts and data are relatable.

Figure 4:
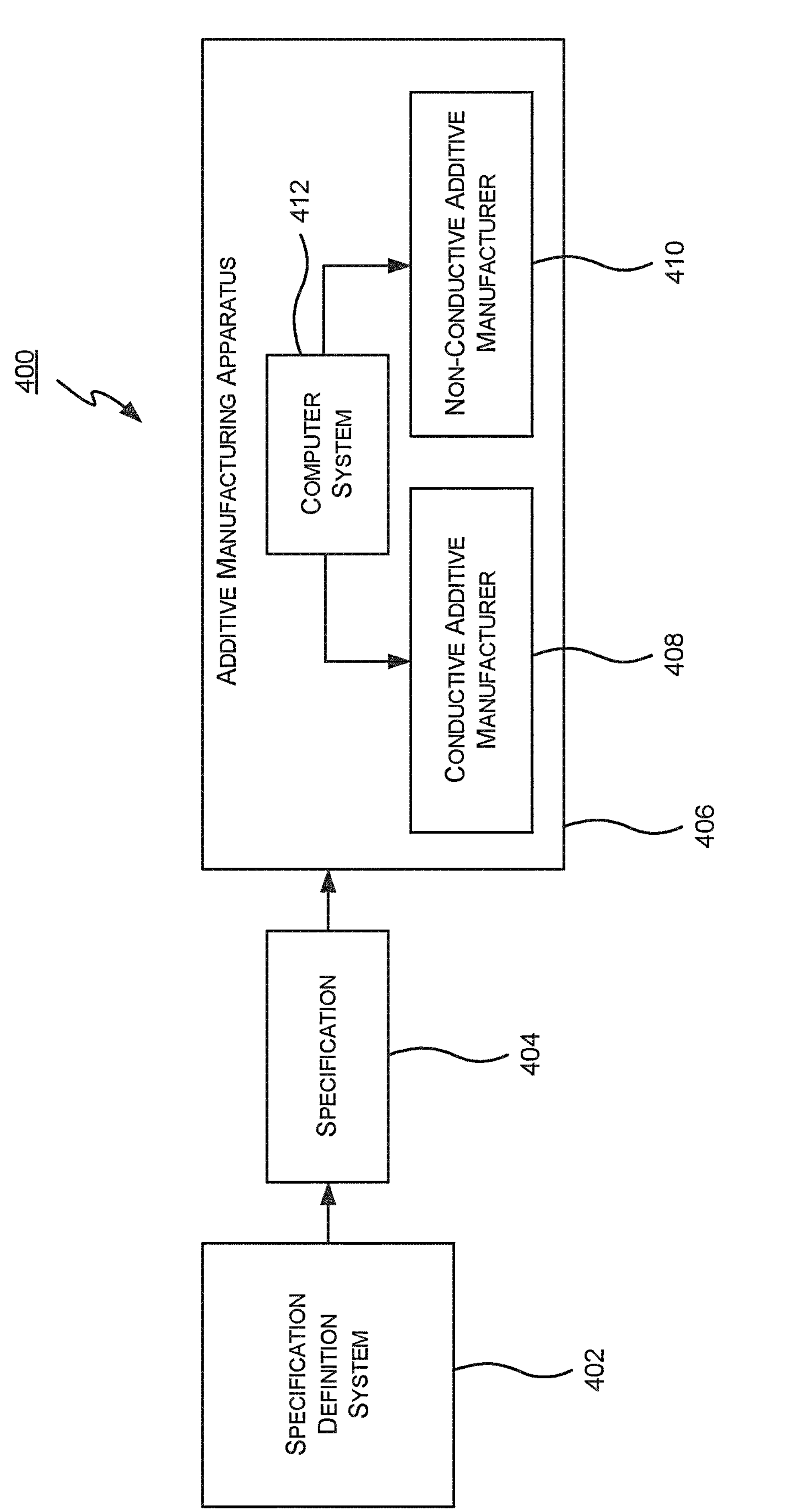
FIG. 4 is a component diagram of an additive manufacturing apparatus in accordance with the present invention.

FIG. 4 is a component diagram of an additive manufacturing apparatus 406 in accordance with the present invention. The additive manufacturing apparatus 406 is a combination apparatus including a conductive additive manufacturer 408 for forming three dimensional structures from electrically conductive material, and a non-conductive additive manufacturer 410 for forming three dimensional structures from non-electrically conductive material. Manufacturers 408 and 410 are arranged so as to operate on the same subject article during manufacture such that the article can be subject to either or both of the manufacture of conductive content and non-conductive content. It will be appreciated by those skilled in the art that the two manufacturers 408 and 410 can be combined or integrated into a single component capable of operating in multiple modes of capable of accommodating both conductive and non-conductive materials. The two manufacturers 408 and 410 operate in synchronisation and/or contemporaneously or a mixture of both synchronised and contemporaneous modes. For example, where a conductive additive manufacturing process occurs such that a non-conductive process could occur at the same time, then a contemporaneous mode of operation can be employed.

The operation of the manufacturers 408 and 410 is computer controlled. In FIG. 4, a computer system 412 is communicatively connected to the conductive additive manufacturer 408 and the non-conductive additive manufacturer 410 for instructing each of the manufacturers 408 and 410 as to additive manufacturing operations that are to be undertaken. The computer system 412 is responsive to a specification 404 for an article for manufacture. The specification 404 is a digital representation of a three dimensional specification of an article for manufacture. For example, for an extrusion-based manufacturing process, the specification can include a definition of the materials for extrusion and the locations, positions, arrangements or configurations of one or more extruding heads, heads for a binder, setter, epoxy or the like and/or a table, workpiece or article holder. The manufacturing process can be defined using vector definitions specifying the discrete or relative movement or relocation etc. Alternatively, in a granular fusing based additive manufacturing approach, a location of fusing, binding, heating or the like can be specified by the specification 404, such as by way of control instructions for a laser or similar fusion mechanism. In embodiments of the present invention, the specification 404 is in the form of the Additive Manufacturing File format (AMF) or a Stereolithography file format (STL).

The specification 404 is provided by a specification definition system 402 such as a 3D modelling system, a computer aided design (CAD) or computer aided manufacturing (CAM) system as are known in the art. Such systems can be adapted to generate the specification 404 in an AMF or STL format. Such formats can be adapted to include additional information relating to electronic circuit elements such as active and passive components and electrical connections therebetween.

Figures 5A, 5B:
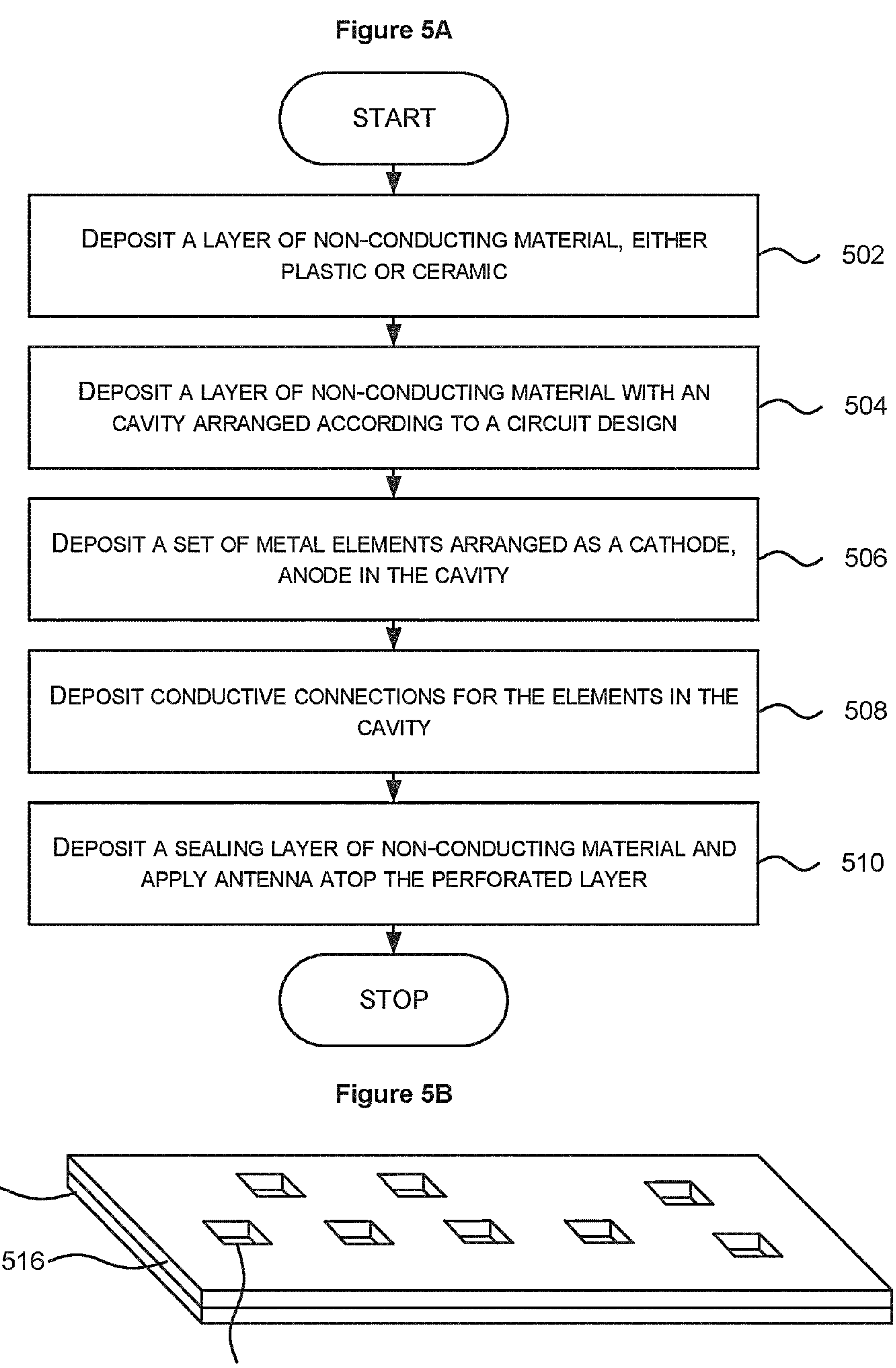
FIG. 5*a* is a flow chart for manufacturing the antenna device of FIG. 2 and FIG. 5*b* shown the layers formed.

FIG. 5*a* is a flow diagram setting out the main steps for the manufacture of the antenna array of the present invention. The layers formed are shown in FIG. 5*b*. The method is implemented on an additive manufacturing apparatus as described above or any other suitable 3D printing system. Initially, at step 502, a layer of non-conducting material is deposited by an additive manufacturing process as a substrate 512, such as a plastic or ceramic layer. At step 504 a layer of non-conducting material with one or more cavities 514 is deposited by an additive manufacturing process as a perforated layer 516. The configuration of the cavities 514 is defined by a circuit design included in a specification 404 of an article for manufacture and is shaped as shown in FIG. 2 or one of the other possible topologies mentioned above. At step 506 a set of metal elements are deposited in the cavities 514 by an additive manufacturing process arranged as a cathode, anode and, as required, any other electrical device or structure. At step 508 conductive connections for the elements in the cavities are deposited by an additive manufacturing process. The conduits and vacuum vent (not shown) are formed in one or more of the steps. At step 510 a sealing layer 220 is deposited and the antenna 218 are positioned atop the perforated layer 304. The antenna can also be printed.

The present invention gives rise to some significant advantages. These include but are not limited to:

- creating a lower cost method of deploying 5G services at scale;
- the ability to reconfigure production of the PAA to suit multiple applications, e.g. communications or radar;
- an ability to reconfigure the power output, or frequency range of the PAA;
- variable geometry and design possible in software, i.e. can produce circular or rectangular PAA;
- Reduced production cost compared to current solid state PAA.

It will be appreciated that passive electronic components can also be formed as part of an additive manufacturing process, such as resistors and capacitors. Such passive components are relatively straightforward to manufacture. For example, a resistor can be formed as a solid printed blocks of ceramic material. A means of insulation of the passive component from the substantive body of the article may be required and can be achieved by enclosing such components in apertures within an article, suspended or held in place by electrical connections. Similarly, capacitors can be created using a structure similar to the active electronic devices except with 2 parallel metallic plates deposited within the aperture. Thus active and passive components required for substantially all electronic and logic requirements of an electronic apparatus can be formed integrally within a three dimensional article using the additive manufacturing approach.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A 3D printed antenna array comprising a plurality of 3D printed antenna devices, each 3D printed antenna device comprising:

an anode;

a cathode;

a cavity connected between the anode and the cathode and configured to resonate at a predetermined frequency and power, wherein the anode substantially surrounds the cavity;

an antenna element; and an output feed to extract a radio frequency (RF) signal from the cavity and feed the antenna element; and wherein the plurality of 3D printed antenna devices form a telecommunications antenna array including a phase array antenna (PAA) or a multiple in multiple out (MIMO) antenna.

2. The 3D printed antenna array according to claim 1, wherein the cavity of each 3D printed antenna device is a microwave cavity.

3. The 3D printed antenna array according to claim 1, wherein the cavity of each 3D printed antenna device has a predetermined topography.

4. The 3D printed antenna array according to claim 1, wherein the cavity of each 3D printed antenna device has a predetermined size.

5. The 3D printed antenna array according to claim 1, wherein, for each 3D printed antenna device, the cathode is located at one end of the cavity and extends from an input feed through the cavity towards the output feed.

6. The 3D printed antenna array according to claim 1, each 3D printed antenna device further comprising a conduit from the cavity to an exterior surface which is connectable to a vacuum pump to create a vacuum in the cavity.

7. The 3D printed antenna array according to claim 1, wherein the plurality of 3D printed antenna devices are arranged in rows and columns and each is separated from the others by dividers.

8. The 3D printed antenna array according to claim 1, wherein the plurality of 3D printed antenna devices resonate at two or more resonant frequencies.

9. The 3D printed antenna array of claim 8, wherein the two or more resonant frequencies are based on the at least one of frequency, power, shape and or size.

10. The 3D printed antenna array according to claim 1, wherein the 3D printed antenna array is made from at least one conductive material and at least one non-conductive material.

11. A method of manufacturing a 3D printed antenna device comprising using an additive manufacturing process to:

form a non-electrically conductive substrate;

form a non-electrically conductive perforated layer having a cavity;

form electrically conductive anode and cathode elements relative to the cavity;

deposit a conductive electrical connection to each of the elements suitable for imparting an electrical potential difference between the elements;

form an antenna element connected to the cavity; and form a non-electrically conductive sealing layer atop the perforated layer so as to retain and seal the cavity in the perforated layer and support the antenna element.

* * * * *